Dec. 13, 1966 A. D. MARTIN 3,291,879
METHOD AND APPARATUS FOR FABRICATING PLASTIC WEB
Filed Jan. 21, 1965 3 Sheets-Sheet 1
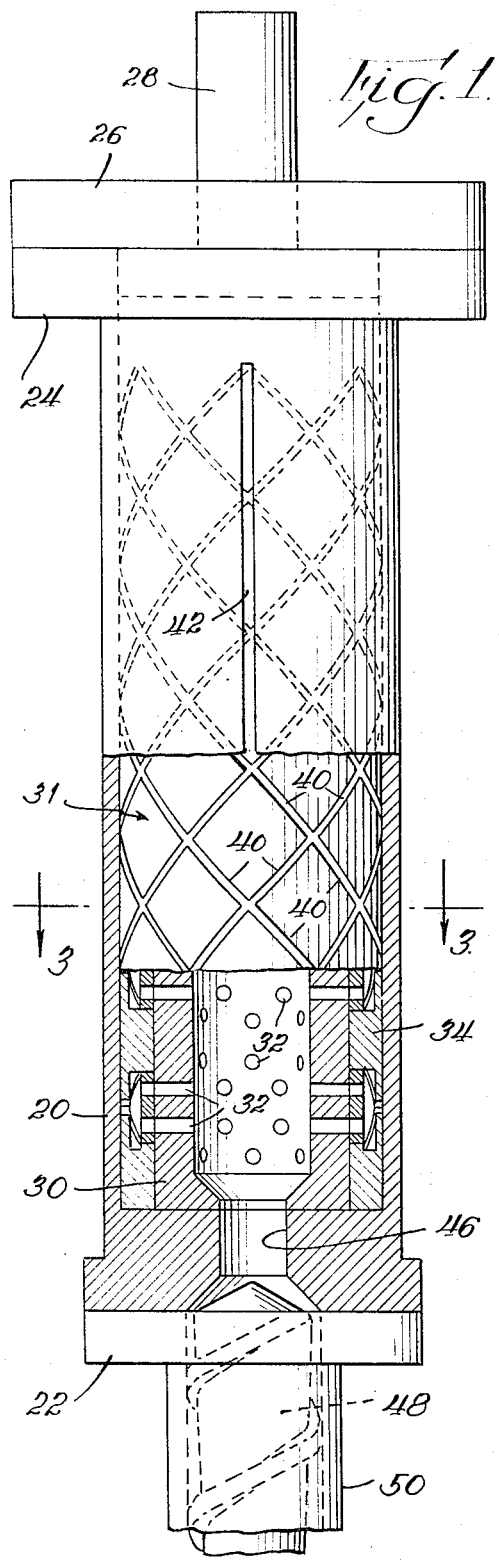
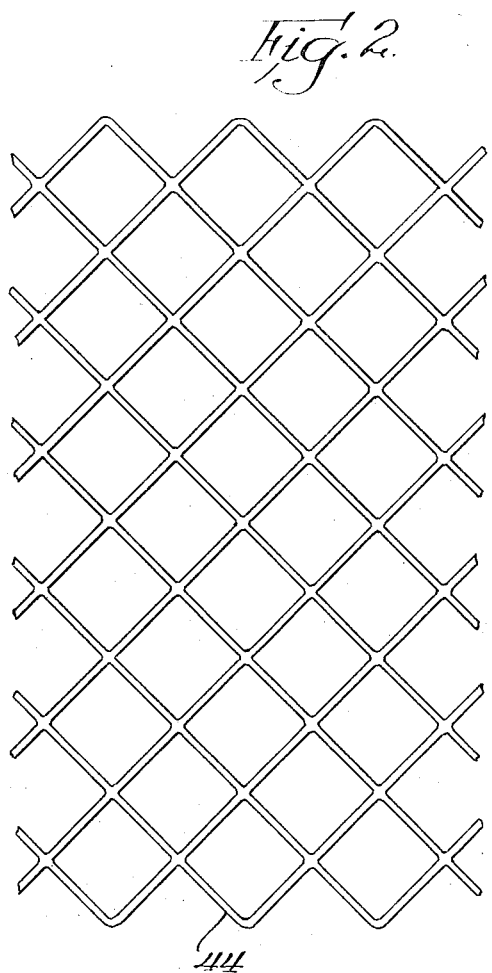
INVENTOR.
Allan D. Martin
BY Stephen J. Rudy
Jerome Rudix
Attys Dec. 13, 1966 A. D. MARTIN 3,291,879
METHOD AND APPARATUS FOR FABRICATING PLASTIC WEB
Filed Jan. 21, 1965 3 Sheets-Sheet 2
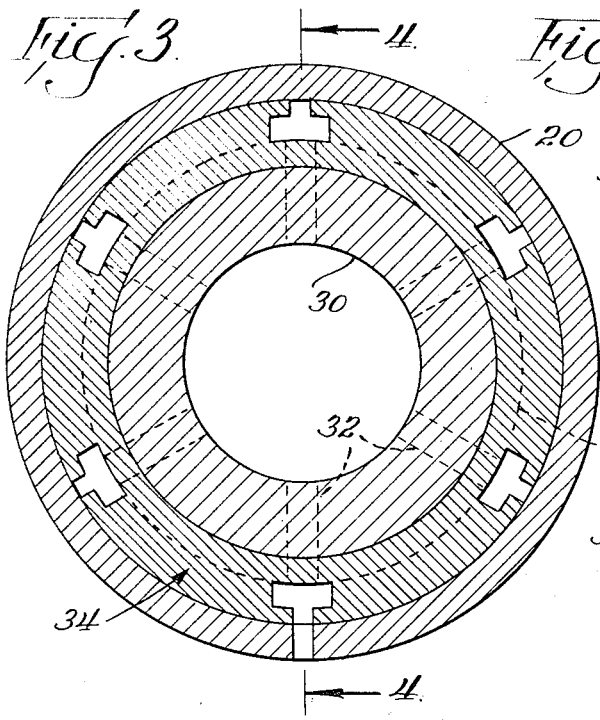
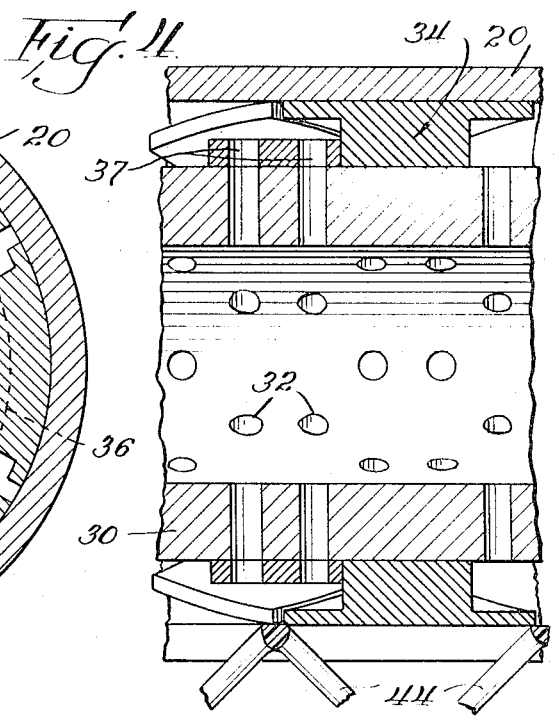
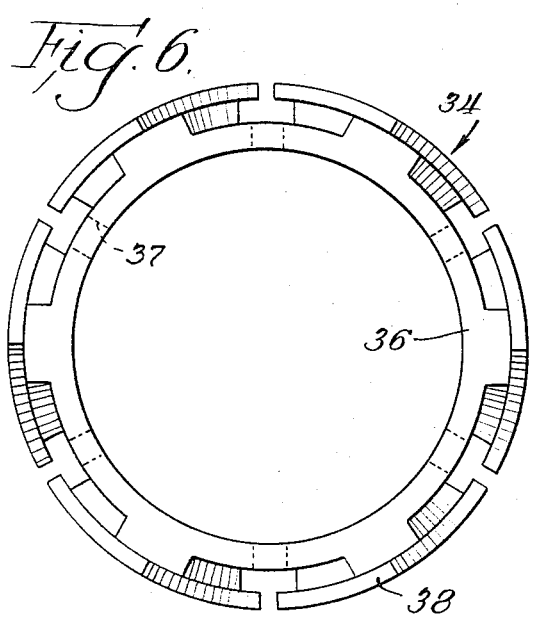
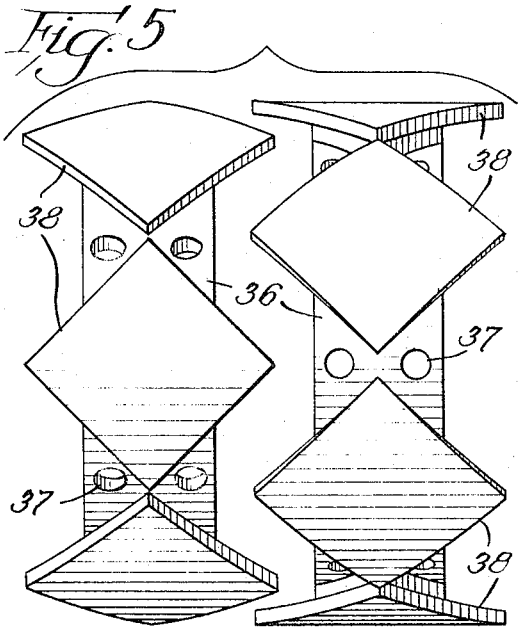
INVENTOR.
Allan D. Martin
BY Stephen J. Rudy
Jerome Rudix
Attys.

INVENTOR
Allan D. Martin

Attys

United States Patent Office 3,291,879
Patented Dec. 13, 1966

3,291,879
METHOD AND APPARATUS FOR FABRICATING PLASTIC WEB
Allan D. Martin, Sanford, Mich., assignor to The Dow Chemical Company, Midland, Mich., a corporation of Delaware
Filed Jan. 21, 1965, Ser. No. 435,396
16 Claims. (Cl. 264—167)

This application is a continuation-in-part of a copending application of Allan D. Martin, filed September 27, 1961, Serial No. 141,161, and now abandoned.

This invention relates to a method and apparatus adapted for extruding patterned shapes, of plastic, and in flat continuous lengths.

A product which is relatively new in the art of plastic extrusion is plastic webbing, or a plastic net-like structure. Various methods and types of apparatus have been designed for extruding the webbing, however, these methods and types of apparatus each have their limitations and are objectionable, for one reason or another. One such method and apparatus is disclosed in U.S. Patent 2,919,467, issued January 5, 1960, to F. C. Mercer. According to the teaching of that patent, a net-like structure is obtained, in effect, by longitudinally splitting or shearing strands of material as they move from an extrusion nozzle. Predetermined lengths of each strand are left unsplit whereby adjoining strands will be interconnected in a manner as to form a net-like structure. The strands, in this case, are tubular or cylindrical in shape, and the cross-sectional area of the intersections are substantially double, or at least greater than that of the strands.

Still another method and apparatus is disclosed in U.S. Patent 2,693,007, issued November 2, 1954, to T. J. Rhodes. The method and apparatus of this patent is entirely different from that of the Mercer patent. According to the teaching of Rhodes, plastic material is extruded directly into mold cavities which are contained on the surface of a cylinder plunger. The method may therefore be classified as a casting, rather than an extruding, technique. Another patent issued to Rhodes, namely: U.S. Patent 2,892,212, issued June 30, 1959, is a mere modification of the first mentioned patent, and it may likewise be classified as a casting technique.

Still another method and apparatus for providing plastic webbing is disclosed in U.S. Patent 3,085,292, issued April 16, 1963, to H. V. Kindseth. The apparatus and method of this patent is similar to that of the above mentioned Rhodes patents in that the plastic material is extruded into grooves formed in molding roll.

In a copending application of Allan D. Martin and Irving S. Houvener, Serial No. 141,163, filed September 27, 1961, still another method and apparatus is disclosed for fabrication of a tubular film of plastic material having a helical cross ribbed exterior surface. While the apparatus of the copending application may be supplemented to provide plastic webbing of flat continuous lengths, the apparatus of the present invention may be utilized to fabricate such a product, as well as a whole host of other variously patterned shapes, in a somewhat more expeditious manner.

In reviewing the method and apparatus of some of the above mentioned patents, it is apparent that some of them also suffer the disadvantage in that they are generally limited in application, to fabricating only one particular product, namely: plastic webbing or plastic net-like structure, and cannot be easily modified, at least without departing from the teachings thereof, to fabricate other variously shaped products.

The apparatus of the present invention will form strands having a full, or unsplit diameter, and furthermore, will extrude a webbing which is in flat shape requiring no further forming operations. In addition, a multiplicity of webbing patterns may be produced by varying the shape of the extruding arbor nozzles, and/or by varying certain operating conditions, as will be discussed hereinafter. The apparatus can also be easily modified to produce a whole host of variously patterned shapes, such as stars, diamonds, circles, script, etc., hence it is particularly adaptable for numerous applications, other than forming plastic webbing.

It is therefore an object of this invention to provide a method and apparatus for fabrication of a whole host of patterned shapes, of plastic, and in a flat continuous manner.

Another object is to provide a method and apparatus for fabrication of patterned shapes, of plastic, wherein the pattern may be easily varied.

It is still another object to provide a method and apparatus for fabrication of plastic webbing extruded in a flat continuous manner.

It is still another object to provide a method and apparatus for fabrication of a plastic webbing wherein the webbing pattern may be easily varied.

Other objects of the invention will in part be obvious and will in part appear hereinafter.

The invention here involves the extrusion of plastic material into the interior of an outer cylindrical casing and an inner cylinder assembly. The assembly is rotatably mounted within the casing. The inner cylindrical assembly has a series of grooves therein, such as illustrated in FIG. 1, or may have various other shapes, such as shoe soles and stars formed by the forming parts illustrated in FIGS. 7 and 8, as well as a whole host of other shapes. The outer cylindrical casing has a longitudinal slot (42) as seen in FIG. 1 of the drawing. Now, as the extrudable plastic material passes from the interior of the inner cylinder assembly out through the grooves on its surface, it forms itself into a pattern. Then, as it passes out through the longitudinal slot 42 of the outer casing, the pattern set up by the grooves, or other cavities formed, is retained in the extruded sheet emerging from the slot. It is a unique approach to the manufacture of webbing, shoe soles, stars and the like.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

FIGURE 1 is a plan view in partial section of extrusion apparatus representing an embodiment of the invention;

FIGURE 2 is a length of flat webbing produced by the apparatus of FIG. 1;

FIGURE 3 is a section view, slightly enlarged, as seen from line 3—3 in FIG. 1;

FIGURE 4 is a fragmentary section view as seen from line 4—4 in FIG. 3;

FIGURE 5 is an exterior side view of web forming nozzle parts used in the apparatus of FIG. 1;

FIGURE 6 is an end view of the parts as shown in FIG. 5;

Figure 9:
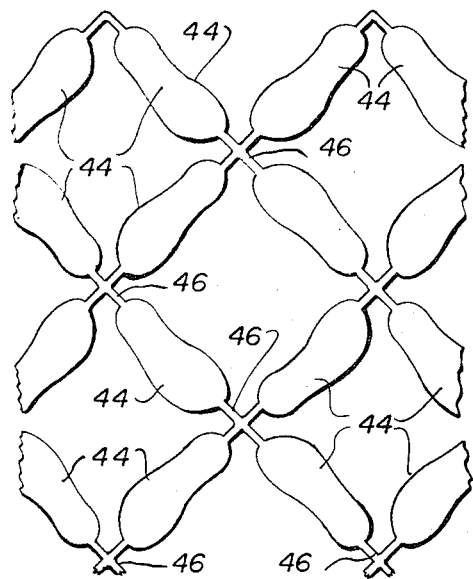
Figure 7:
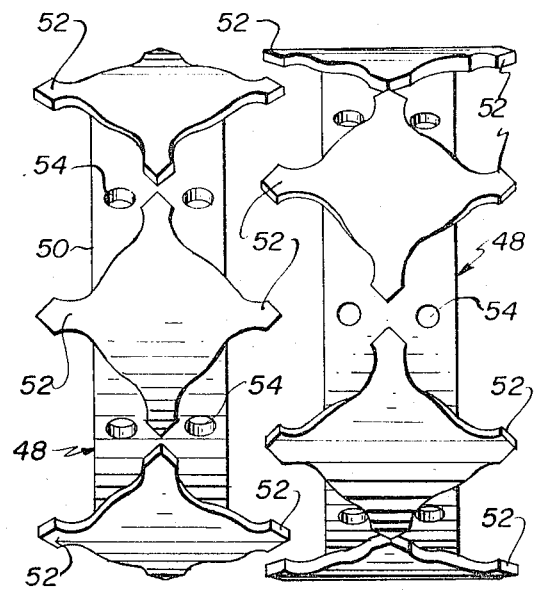
Figure 10:
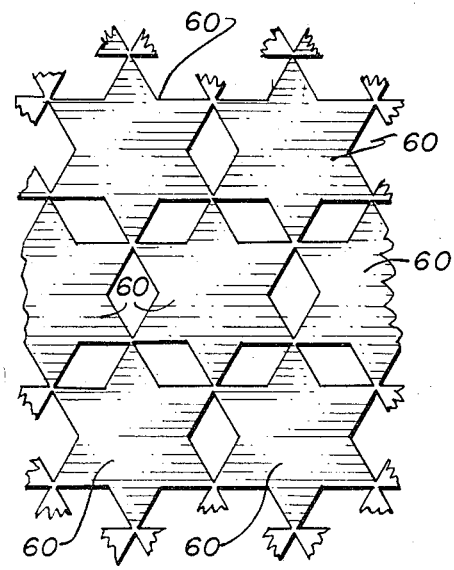
Figure 8:
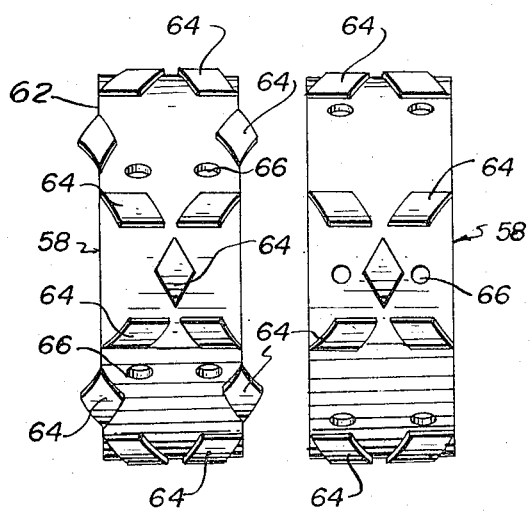

FIGURES 7 and 8 are exterior side views of pattern forming nozzle parts used in the apparatus of FIG. 1; and FIGURES 9 and 10 are views illustrating the patterns, or products, formed with the pattern forming nozzle parts of FIGS. 7 and 8, respectively.

The extrusion apparatus of the invention includes an outer casing 20 which is secured at one end to an extruder barrel flange 22, and at the other end to a casing flange 24. The latter is affixed to an end cap 26 which also serves as a bearing for a drive shaft 28. A cylindrical arbor 30 is positioned within the casing 20, which arbor is rotatably driven by the shaft 28 actuated by a motor means (not shown). A plurality of radially disposed metering holes 32 are arranged in the arbor 30.

The arbor 30 forms parts of a cylinder assembly 31 having, according to a first embodiment of the invention, a plurality of web forming parts 34, each of which includes a ring-like member 36 (FIG. 5) having a plurality, (six as shown) of generally square, raised, integral projections 38. Each ring 36 has a plurality of holes 37 positioned for alignment with metering holes 32. The two intersecting major axes of each projection are respectively arranged to extend in planes which are parallel with and normal to the longitudinal axis of the arbor 30. When the web forming parts 34 are assembled upon the arbor 30, the sides of a projection 38 on one of the parts 34 will be in spaced relation to the sides of two adjacent projections 38 of another part 34. In such manner, a plurality of intersecting spiral grooves 40 will be generated upon the surface of the cylinder assembly 31 which grooves are in communication with the inside of the arbor via the holes 37 and 32.

The outer casing 20 is formed with a slot 42, which is parallel with the arbor axis and coextensive with the longitudinal bounds of the spiral grooves 40. In operation, the extrusion apparatus is positioned so that the slot 42 is in a horizontal plane. Pressurized plastic material within the grooves 40, which material enters the grooves from the arbor holes 32, will be extruded through the slot 42 at every interchange of the slot and a groove 40 as the arbor 30 is rotated by the drive shaft 28. As a result, a flat webbing 44, having a generally square, lattice pattern as illustrated in FIG. 2, will be produced in continuous lengths. Upon emerging from the extrusion apparatus, the webbing 44 may be moved through a liquid bath (not shown), or air cured, depending upon the type of material being processed, which technique is well known to those skilled in the art.

Plastic material, such as normally solid polyolefins, particularly polyethylene, polypropylene, copolymers of ethylene and propylene and the like, polystyrene and nylon, molten metals such as lead and so forth, may be used in the extrusion apparatus disclosed. The material is fed into the arbor 30 via a sprue 46 provided in the end of casing 20, which material is forced therein by a screw 48 of an extruder means, the barrel 50 only of which is shown.

It will be apparent that the pattern of the webbing extruded will depend upon the configuration of the grooves 40, and the slot 42, as well as the velocity of extrusion and the relative speed between the arbor 30 with its attached web forming parts 34, and the casing 20.

In FIG. 9 there is shown a plurality of shoe soles 44, formed in a continuous length of plastic material, by means of the extrusion apparatus of the invention. Each of the plurality of shoe soles is connected by a small intersecting web 46 which may be easily severed to provide individual shoe soles.

The shoe soles are easily fabricated, merely by modifying the extrusion apparatus shown in FIG. 1, by substituting the shoe sole forming parts 48 shown in FIG. 7 for the web forming parts 34, of FIG. 5. Each of the sole forming parts 48 includes a ring-like member 50 having a plurality of generally rectangular shaped, raised, integral projections 52 thereon. The sides of the projections 52 are contoured so that when the ring-like members 50 are assembled upon the arbor 30, in the manner previously described, the sides on one projection on one of the parts will be in spaced relation to the sides of adjacent projections to form a plurality of intersecting cavities resembling a shoe sole. Each ring 50 has a plurality of holes 54 positioned for alignment with metering holes 32 and for communicating with the cavities formed by the projections 52.

In operation, the extrusion apparatus functions in the manner described above, but instead of fabricating plastic webbing, a plurality of shoe soles, interconnected by the small webs 46, are fabricated. The shoe soles are extruded through the slot 42 at every interchange of the slot 42 and a cavity as the arbor 30 is rotated by the drive shaft 28.

In FIGS. 8 and 10 there is shown star forming parts 58 and the continuous length of interconnected stars 60, formed with the extrusion apparatus of FIG. 1 when the star forming parts 58 are substituted for the web forming parts 48. The star forming parts 58 also includes a ring-like member 62 having a plurality of generally diamond-shaped, raised, integral projections 64 thereon. The projections 64 are positioned so that when the ring-like members 62 are assembled upon the arbor 30, the sides will be in spaced relation to the sides of adjacent projections to form a plurality of intersecting star shaped cavities. Each ring 62 has a plurality of holes 66 positioned for alignment with the metering holes 32 and for communicating with the cavities formed by the projections 64.

It is therefore apparent that the extrusion apparatus of the present invention is particularly applicable for fabricating a whole host of variously shaped patterns, in a continuous fashion, merely by substituting an appropriately shaped forming part, such as the forming parts 36, 48 and 58. It is also apparent that this substitution can be easily and quickly accomplished, with a minimum of delay. Examples of other types of patterns which may be formed are diamond shapes, circles, script and the like.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A method for fabricating a flat plastic web pattern of abstract shape comprising the steps of forming said web pattern of abstract shape on the peripheral surface of a cylindrical member, confining said cylindrical member within an outer cylindrical member having a slot formed therein, extruding extrudable plastic material into said pattern, and rotating one of said cylindrical members to extrude said formed abstract shaped web pattern out through said slot.

2. A method for fabricating a flat plastic web pattern of abstract shape comprising the steps of forming said web pattern of abstract shape on the peripheral surface of a cylindrical member, confining said cylindrical member within an outer cylindrical member having a slot formed therein, extruding extrudable plastic material into said pattern, and rotating said cylindrical member past said slot to extrude said formed abstract shaped web pattern out through said slot.

3. A method of repetitively fabricating a web pattern of abstract shape in a continuous length comprising the steps of forming a web pattern of abstract shape on the peripheral surface of a cylindrical member, confining said cylindrical member within an outer cylindrical member having a slot formed therein, extruding extrudable plastic material into said pattern, rotating the inner one of said cylindrical members past said slot to extrude said formed abstract shaped web pattern out through said slot, and continuously replacing material being removed from the pattern.

4. Apparatus for fabricating flat plastic web patterns of abstract shape comprising an outer cylindrical casing, a cylinder assembly rotatably mounted in said casing, and means to rotate said cylinder assembly, said cylinder assembly being formed with a plurality of grooves of abstract shape on its peripheral surface and having means therein for conduction of plastic material to said grooves, said casing being formed to provide a slot coextensive with the longitudinal bounds of said grooves whereby plastic material can be extruded and will flow out at every point of intersection of the grooves and the slot.

5. In apparatus for fabricating a flat plastic web pattern of abstract shape including, a cylindrical casing, and a cylinder assembly rotatably mounted in the casing, and means to rotate said cylinder assembly, said cylinder assembly being formed to provide a plurality of grooves of abstract shape on its exterior surface and being further formed to provide for conduction of plastic material to said grooves, said casing being formed to provide a slot coextensive with the longitudinal bounds of the grooves and through which plastic material will flow at every intersection of the grooves and the slot.

6. In apparatus for fabricating a flat plastic web pattern of abstract shape, as claimed in claim 5, wherein said cylinder assembly includes a plurality of ring-like members each having a plurality of generally rectangular-shaped, raised, integral projections, the sides of which are contoured so as to form when assembled adjacent one another a groove having an abstract shape defining a predetermined pattern, the major axes of each projection being arranged to extend in planes parallel with and normal to the longitudinal axis of said cylindrical casing.

7. In apparatus for fabricating a flat plastic web pattern of abstract shape, as claimed in claim 6, wherein said groove having an abstract shape formed by said projections defines a shoe sole pattern.

8. In apparatus for fabricating a flat plastic web pattern of abstract shape, as claimed in claim 6, wherein said groove having an abstract shape formed by said projections defines a star pattern.

9. In apparatus for fabricating a flat plastic webbing including, an outer cylindrical casing, and a cylinder assembly rotatably mounted in the casing, and means to rotate said cylinder assembly, said cylinder assembly being formed to provide a plurality of intersecting abstract shaped grooves on the surface thereof and being further formed to provide for conduction of plastic material under pressure to said grooves, said casing being formed to provide a slot arranged parallel with the axis of the cylinder assembly and coextensive with the longitudinal bounds of said grooves so that plastic material will be extruded through every point of intersection of the grooves and the slot.

10. In apparatus for the continuous extrusion of a flat plastic webbing comprising, an outer cylindrical casing, and a cylinder assembly rotatably mounted in the casing, and means to rotate said cylinder assembly, said cylinder assembly including an arbor formed to provide a plurality of radially disposed metering holes passing through the wall thereof, pattern forming means mounted upon the arbor and formed to provide a plurality of intersecting abstract shaped grooves on the peripheral surface of the cylinder assembly which grooves are in communication with said metering holes, said casing being formed to provide a slot arranged parallel with the axis of the arbor and coextensive with the longitudinal bounds of said grooves so that plastic material will be extruded through every point of intersection of the grooves and the slot.

11. In apparatus for fabricating a flat plastic webbing including, a cylindrical casing, and a cylinder assembly rotatably mounted in the casing, and means to rotate said cylinder assembly, said cylinder assembly being formed to provide a plurality of grooves on its exterior surface and being further formed to provide for conduction of plastic material to said grooves, said casing being formed to provide a slot coextensive with the longitudinal bounds of the grooves and through which plastic material will flow at every intersection of the grooves and the slot.

12. In apparatus for fabricating a flat plastic webbing including, an outer cylindrical casing, and a cylinder assembly rotatably mounted in the casing, and means to rotate said cylinder assembly, said cylinder assembly being formed to provide a plurality of intersecting spiral grooves on the surface thereof and being further formed to provide for conduction of plastic material under pressure to said grooves, said casing being formed to provide a slot arranged parallel with the axis of the cylinder assembly and coextensive with the longitudinal bounds of said grooves so that plastic material will be extruded through every point of intersection of the grooves and the slot.

13. In apparatus for the continuous extrusion of a flat plastic webbing comprising, an outer cylindrical casing, and a cylinder assembly rotatably mounted in the casing, and means to rotate said cylinder assembly, said cylinder assembly including an arbor formed to provide a plurality of radially disposed metering holes passing through the wall thereof, webbing forming means mounted upon the arbor and formed to provide a plurality of intersecting helical grooves on the peripheral surface of the cylinder assembly which grooves are in communication with said metering holes, said casing being formed to provide a slot arranged parallel with the axis of the arbor and coextensive with the longitudinal bounds of said grooves so that plastic material will be extruded through every point of intersection of the grooves and the slot.

14. In apparatus according to claim 13, wherein said web forming means includes a plurality of ring-like members each having a plurality of generally square, raised, integral projections the major axes of each projection being arranged to extend in planes parallel with and normal to the longitudinal axis of said arbor.

15. In apparatus according to claim 14, wherein each ring-like member is formed to provide a plurality of holes which are arranged for alignment with the metering holes of the arbor whereby plastic material may be fed from the arbor into the grooves.

16. In apparatus according to claim 14, wherein one end of the casing is formed to provide a sprue whereby plastic material may be fed into the interior of the arbor.

References Cited by the Examiner

UNITED STATES PATENTS

| | | |
|---|---|---|
| 934,212 | 9/1909 | Ratignier et al. |
| 3,085,292 | 4/1963 | Kindseth _____ 264—167 |

FOREIGN PATENTS

| | | |
|---|---|---|
| 245,823 | 10/1960 | Australia. |
| 368,393 | 10/1906 | France. |
| 1,258,370 | 3/1961 | France. |
| 1,109,131 | 6/1961 | Germany. |
| 182,336 | 3/1950 | Japan. |

ROBERT F. WHITE, *Primary Examiner.*

ALEXANDER H. BRODMERKEL, *Examiner.*

A. L. LEAVITT, *Assistant Examiner.*